Oct. 8, 1940.     M. GEIGER     2,217,401
SAW-TOOTH WAVE GENERATOR
Filed Sept. 17, 1938

INVENTOR
MAX GEIGER
BY
ATTORNEY

Patented Oct. 8, 1940

2,217,401

UNITED STATES PATENT OFFICE 2,217,401

SAW-TOOTH WAVE GENERATOR

Max Geiger, Berlin, Germany, assignor to Telefunken Gesellschaft für Drahtlose Telegraphie m. b. H., Berlin, Germany, a corporation of Germany Application September 17, 1938, Serial No. 230,399
In Germany June 15, 1937

3 Claims. (Cl. 250—36)

For the production of a saw-toothed shaped current wave of the kind required for feeding the time-base or deflector coils of cathode ray tubes used in television work, it has already been suggested in the prior art to provide in the grid circuit of a controlled tube such as a thyratron a parallel resonant circuit, with a resistance in series with a source of D. C. voltage supply being connected in parallel relation to the condenser thereof, while the inductive branch thereof in series with a coil contains a unilaterally conducting discharge path. In such a circuit organization, by the co-action of a feedback between the plate circuit and the said controlled tube and the coil of the parallel resonance circuit, quarter waves are set up which represent the return stroke or flyback part of the sawtooth wave, in other words, its rapidly dropping stroke or downstroke, while the charge of the condenser in the parallel resonance circuit occurs in one sense through the resistance and in the other sense through the said quarter oscillation or cycle.

My invention will best be understood by reference to the drawing in which

Figure 1:
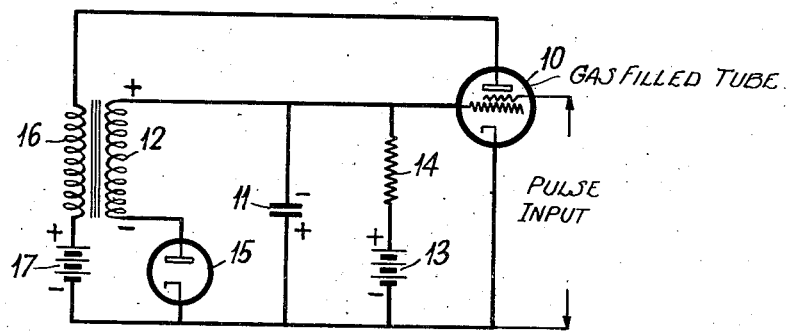
Fig. 1 is one embodiment thereof.

Before discussing more fully the features of the present invention whose main object is to stabilize saw-tooth wave generators operating according to this principle, the arrangement and the operation of the suggested circuit scheme shall again be set forth by reference to Fig. 1 of the drawing. Referring to Fig. 1, the parallel resonance circuit in the grid circuit of the controlled tube 10 comprises the condenser 11 as well as the choke coil 12. In parallel relation to the condenser 11 is a source of D. C. potential 13 in series with a resistance 14, while in the coil branch in series with the coil 12 is a rectifier 15. The said coil 12 is in inductive coupling relationship with the coil 16 included in the plate circuit of tube 10. The plate potential source is indicated at 17.

To explain the operation of the organization shown in Fig. 1, the assumption shall first be made that at the condenser 11 prevails a charge of such polarity that the terminal thereof connected to the grid of tube 10 is negative. Suppose further that, in the presence of these conditions, there is as yet no plate current flow, in fact, it shall be assumed that the control grid is at a potential which lies below the limit and value corresponding to the bottom knee of the plate-current grid voltage characteristic. With these presuppositions there is no current flow either in the plate circuit or in the branch of the resonance circuit which comprises the coil 12 and the rectifier 15. Now, from the source of potential supply 13 the condenser will then be charged through the resistance 14, the voltage at the condenser following an e function, tending initially towards zero condenser potential. This shape and trend of the potential prevailing at the condenser will also persist without change even when the control grid of the tube 10 has reached a potential such that current flows in the plate circuit of this tube. It will be seen that in this case a constant potential will only arise at the coil 12, and this potential shall be assumed to have a sign such that the terminal thereof connected to the grid of the tube 10 is positive. If, then, before the control grid of tube 10 reaches filament potential, the differential quotient of the current rise in the plate circuit in some way reverses its sign, and this, for instance, may be insured by impressing upon a further control grid of the tube 10 an impulse resulting in a reduction of the current, the sign of the potential across the coil 12 will be reversed. In so far as the reversed potential at the coil is higher than the potential still prevailing at the condenser 11 and having a polarity as hereinbefore indicated, the rectifier 15 will be opened, that is, permit flow of current. What then happens is that the entire magnetic energy of the coil 16 becomes discharged through the rectifier 15, and the condenser 11 will again be charged up strongly as hereinbefore explained. Because of the uni-lateral conductivity of the rectifier 15, this charge action is interrupted after a quarter cycle, in other words, as soon as the current passes through zero, since, because of such unilateral conductivity or valve action, the reversed current required for the next quarter cycle is unable to pass through the rectifier. Next, this process is reiterated in a way as just described. At the condenser 11 arises a saw-tooth shaped voltage wave which consists of a long (up) stroke following an exponential or linear law, and a short down stroke of a quarter cycle.

The operation of this circuit organization will not be altered to any essential extent if the condenser voltage is permitted to reach zero and rise to values having the inverse sign indicated in Fig. 1. For it will be noted that at the coil 12, as long as the plate current of the tube 10 as yet shows any rise at all, there prevails always a potential having a polarity as hereinbefore explained. The same is constant as long as an unvaried slope or rate of current rise is present in the plate circuit. Hence, inasmuch as the condenser voltage always keeps on rising, the voltage across the coil 12, even without an impulse tending to diminish the plate current, must sooner or later be overcome with the consequence that the rectifier 15 becomes transmitting (conductive). Next, the action as above outlined of re-charging of the condenser is caused to recur, in an identical manner, to a potential of a polarity as indicated in Fig. 1, the attained voltage level at the condenser 11 being essentially governed again by the magnetic energy of the coil 16. The character of the voltage curve at the condenser 11 again is the same as above mentioned.

If at the very beginning of such an examination of condition, there is chosen at the condenser 11 a potential in the presence of which a finite plate current is permitted to flow, a saw-tooth shaped current will be obtained in the plate, and thus the coil 16 could be designed directly to act as a time-base or deflector coil for a cathode-ray tube.

Figure 2:
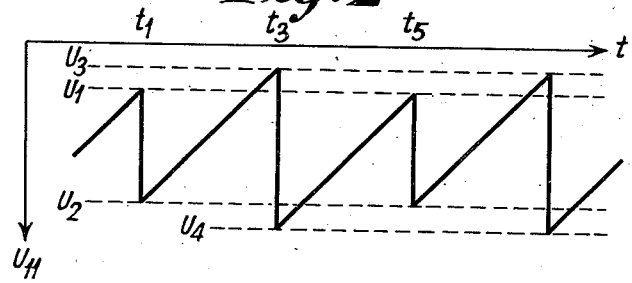
Fig. 2 is an explanatory curve.

The invention particularly has the object to prevent the production of saw-tooth waves of varying amplitude which inherently is liable to arise in saw-tooth wave generators of this nature. As shall at once be explained, by the influence of synchronizing impulses of stabilized frequency, a voltage wave $U_{11}$ as shown in Fig. 2 may be produced at condenser 11. In order to understand this action it must be kept in mind that the charge which the condenser 11 receives in a quarter-wave or cycle action is predicated upon the magnetic energy of the coil 16. Hence, if at the instant $t_1$ the bottom coat of the condenser 11 is at a potential as indicated by $u_1$, Fig. 2, there will correspond to the said potential a certain plate current of tube 10 and thus a certain magnetic energy of coil 16. Suppose that if at time $t_1$ a synchronizing impulse is coming in, then the said energy results in a potential $u_2$ at the condenser 11. Inside the constant time interval up to instant $t_3$ when another synchronizing impulse arrives, the condenser voltage shall be assumed to have shifted to the value $u_3$. To this value $u_3$ corresponds a higher plate current than to value $u_1$ and as a consequence the plate voltage declines to a lower value $u_4$ than value $u_2$ inasmuch as the variation of the charge at the condenser must also become greater because of the fact that the magnetic energy of coil 16 is then higher. Inside the constant period of time up to instant $t_5$ during which a further synchronizing pulse arrives, there will be caused another variation of voltage at the condenser which, however, since the charge current which flows by way of the resistance 14 is regarded as constant and stable, cannot result again in a voltage value $u_3$. In other words, the voltage drop which occurs at the instant $t_5$ must be less than that at instant $t_3$.

Figure 3:
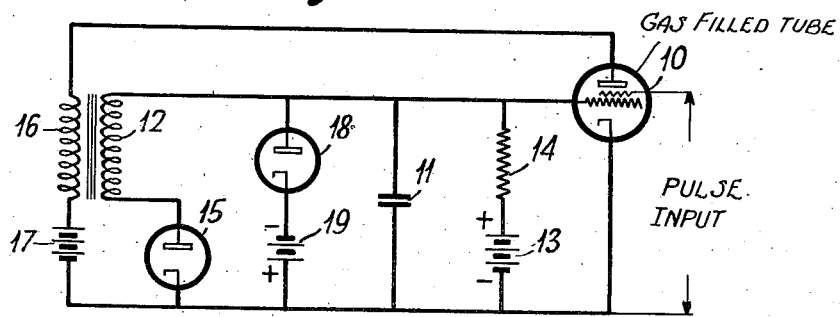
Fig. 3 is a still further embodiment of my invention.

Now, using the correct interpretation of these conditions for a basis the suggestion is here made to connect in parallel relation to the condenser of the oscillatory circuit, a series system consisting of a rectifier 18 and a constant voltage 19 which could consist also of an RC mesh of suitable time-constant, in a way as indicated in Fig. 3. In this circuit organization, return of the condenser voltage is always able to occur only to the same value, that is to say, to the voltage level of the D. C. voltage source 19 so that the production of saw-tooth waves of varying amplitude as explained by reference to Fig. 2 is avoided.

What may again be emphasized here is that the invention is not confined to arrangements in which voltage feedback is effected by the aid of a transformer, but that any desired feedback means designed to furnish a voltage of suitable phase may be employed, say, a reverser tube or a device characterized by negative slope.

What I claim is:

1. A saw-tooth wave generator comprising a parallel resonant circuit having two branches, one branch comprising an inductive member in series with a uni-directional conductor, and the other branch of which comprises a condenser means, a thermionic vacuum tube having anode, cathode and at least one control electrode, said parallel resonant circuit being connected in an electrode-cathode circuit of said thermionic tube, means for coupling said inductive member of the parallel resonant circuit to another of the electrodes of said thermionic tube, and a series circuit comprising a uni-directional conducting member and a source of fixed potential, said series circuit being connected in parallel with said condenser means.

2. Apparatus in accordance with claim 1 wherein the uni-directional conductor in the series circuit recited comprises a diode.

3. Apparatus in accordance with claim 1 wherein there is provided in addition a series circuit comprising a resistive member and a source of substantially constant potential, said series circuit being connected in parallel with said condenser.

MAX GEIGER.